United States Patent [19]

Marcel

[11] Patent Number: 4,825,349
[45] Date of Patent: Apr. 25, 1989

[54] EMERGENCY D.C. POWER SUPPLY WITH THE EMERGENCY STATE BEING INDICATED BY POLARITY REVERSAL

[75] Inventor: François Marcel, Orsay, France
[73] Assignee: Alcatel Cit, Paris, France
[21] Appl. No.: 185,651
[22] Filed: Apr. 25, 1988

[30] Foreign Application Priority Data

Apr. 29, 1987 [FR] France ................. 87 06078

[51] Int. Cl.⁴ ......................... H02J 9/06; H02H 7/00
[52] U.S. Cl. ....................... 363/50; 307/64;
 307/66; 379/387; 379/413
[58] Field of Search ............ 363/50, 63; 307/64–66;
 379/387, 413

[56] References Cited

U.S. PATENT DOCUMENTS

| | | | |
|---|---|---|---|
| 4,636,588 | 1/1987 | Nakayama et al. | 379/387 X |
| 4,647,787 | 3/1987 | Pommer, II | 307/66 X |
| 4,745,299 | 5/1987 | Eng et al. | 307/66 |
| 4,763,013 | 8/1988 | Gvoth, Jr. et al. | 307/66 |
| 4,763,014 | 8/1988 | Model et al. | 307/66 |

FOREIGN PATENT DOCUMENTS

0162563 11/1985 European Pat. Off. .
2585526 1/1987 France .

OTHER PUBLICATIONS

Conference Proceedings, Intelec 85, Seventh International Telecommunications Energy Conference Munich, Oct. 14–17, 1985, Conf. 7, pp. 513–519, IEEE, N.Y., USA; W. Krautkramer et al: "Remote Power Feeding of ISDN-Terminals at the Basic Access", p. 516, line 1—page 519, last line.
Patent Abstracts of Japan, vol. 9, No. 85 (E-308) (1908), Apr. 13, 1985; & JP-A-59 215 170 (Nippon Deshin Denwa Kosha), Dec. 5, 1984.

*Primary Examiner*—Patrick R. Salce
*Assistant Examiner*—Emanuel Todd Voeltz
*Attorney, Agent, or Firm*—Sughrue, Mion, Zinn, Macpeak, and Seas

[57] ABSTRACT

This power supply is intended, more particularly, for powering a user digital terminal from a remote terminal in an integrated service digital telephone network. It comprises a main D.C. electricity power source (10) provided with a protection device (11) causing its output to go to a high impedance state in the absence of a voltage across its terminals, and an auxiliary D.C. electricity power source (20) connected in parallel and in opposition with the main source (10) and provided with a current limiting device (20) which is normally tripped by the additional current which the main source (10) attempts to impose thereon.

9 Claims, 2 Drawing Sheets

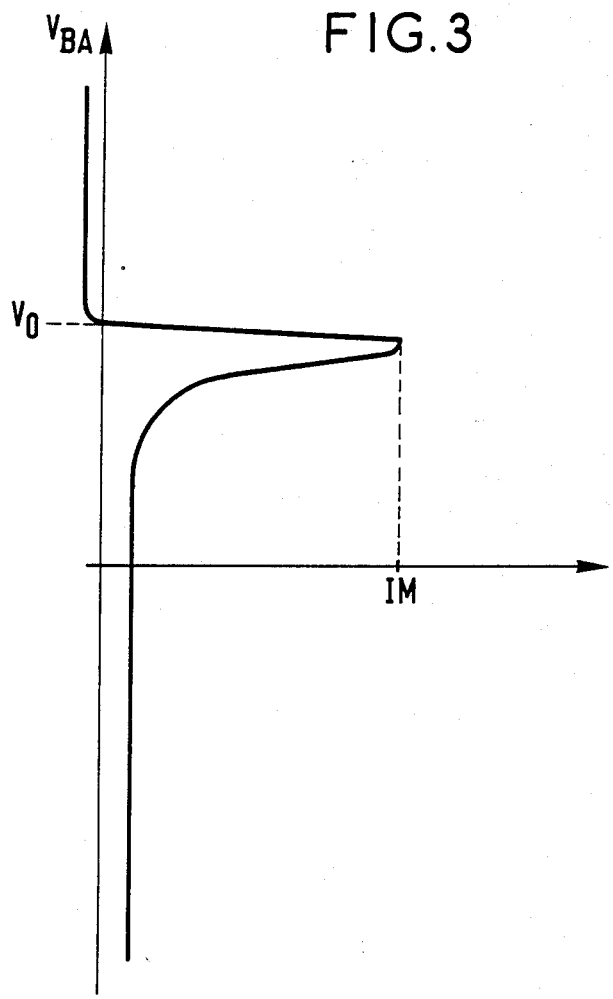

EMERGENCY D.C. POWER SUPPLY WITH THE EMERGENCY STATE BEING INDICATED BY POLARITY REVERSAL

The present invention relates to a D.C. power supply comprising a main power source which delivers D.C. power under normal operating conditions and an auxiliary power source of smaller power than the main source which replaces the main source in the event of a failure while reversing the power supply polarity in order to indicate the presence of the emergency state and in order to reduce the load to an unavoidable minimum by having some components which are not to be powered in the event of a power supply failure connected via a diode which is reversed biased when polarity reversal takes place, while having other components which are to be powered under all circumstances connected via a diode bridge which is insensitive to polarity reversals.

BACKGROUND OF THE INVENTION

This type of D.C. power supply is used, in particular in telecommunications, for integrated service digital networks where the digital terminals that give users access to a wide range of telecommunications services consume too much power to be capable of being remotely powered from the local switching exchange like conventional telephone sets, but where it is nevertheless essential to ensure a minimum telephone service in the event of a failure in the mains locally powering a digital terminal.

The object of the present invention is to provide emergency D.C. power supply of the above-mentioned type where two power sources are capable of operating naturally even when they are geographically separate, without requiring a special signalling link between the sources, thereby making it possible to integrate such an emergency power supply into an access point to a digital network without it being necessary to provide special cabling for a signalling link between the two power sources.

SUMMARY OF THE INVENTION

The present invention provides an emergency D.C. electrical power supply with emergency status being indicated by polarity reversal, the power supply comprising a main D.C. electrical power source provided with a protection device causing its output to go to a high impedance state in the absence of a voltage across its terminals, and an auxiliary D.C. electricity power supply source connected in parallel and in opposition with the main source and provided with a current limiting device which is normally tripped by the additional current which the main source attempts to impose thereon.

In normal operation, the main source imposes its polarity and its current on the load, with the auxiliary source taking only a very small fraction of the current from the main source since its current-limiting device is in operation.

In emergency or back-up operation, i.e. when the main source is not providing power, the auxiliary source imposes its opposite polarity to the load, with the main source taking only a very small fraction of the current from the auxiliary source by virtue of its protection device operating to cause its outlet to take up a high impedance state.

In a preferred embodiment, the device for protecting the main source also acts as a current limiting device, whereas, conversely, the device for limiting the current of the auxiliary source also acts as a protection device, with the devices associated with each of the two sources having the same structure but different current limiting values.

The main and auxiliary sources are advantageously protected against reversal of their respective current flow directions by respective non-return diodes interposed in series with their terminals.

BRIEF DESCRIPTION OF THE DRAWINGS

An embodiment of the invention is described by way of example with reference to the accompanying drawings, in which:

FIG. 3 is a graph showing the voltage-current characteristic of the FIG. 2 power supply in normal operation.

MORE DETAILED DESCRIPTION

A basic access To for a user to the integrated service digital telephone network is constituted, in accordance with the Series I Recommendations of the CCITT for so-called S or T interfaces, by two two-wire links with one link per transmission direction and with each link conveying two 64 kbit/sec digital channels B and one low data rate or telemetry signalling channel D operating at 16 kbit/sec.

Figure 1:
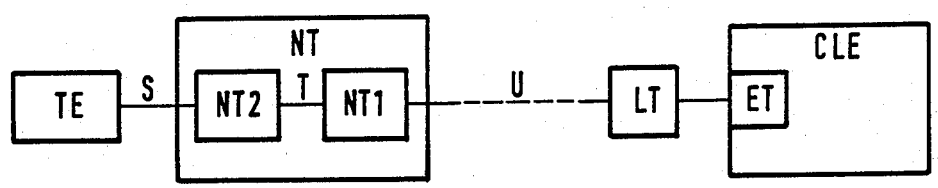
FIG. 1 is a block diagram of an access to an integrated service digital telephone network.

On the premises of the user where they are made use of, these two two-wire links are connected to a digital terminal which constitutes one end of a chain of components including the U interface telephone line connecting the user to the local switching exchange. This chain of components is conventionally represented by a succession of functional boxes is shown in FIG. 1. At the local switching exchange CLE, it begins with a switching network terminal ET serving to perform the functions of terminating the switching network, and an associated line terminal LT which serves to terminate the digital line. At the other, or user, end of the telephone line there is a remote terminal NT which is constituted by at least one NT1 set for terminating the digital line, and which optionally further includes an NT2 set for terminating a subscriber type network and connected to a user digital terminal TE via said S or T interface.

The remote terminal NT has its portion NT1 remotely powered from the line terminal set LT over the telephone line. According to CCITT recommendation I 430, it is required in turn to remotely power the user digital terminal TE over the phantom circuit of the two two-wire links required by the S or T interface, with the power coming from some appropriate source, for example mains, and it must be capable of providing 4 W under normal conditions and a minimum of 420 mW under emergency conditions (no mains) as indicated by a polarity reversal which is used for limiting the remote power supply of the digital terminal TE to emergency functions only, for example to an emergency telephone.

In general, the user digital terminal TE is powered with electricity from the remote terminal NT by means of a main power source at the remote terminal NT which draws its power from the mains, and an auxiliary power source which draws its power from the line terminal LT via the telephone line (U interface) and the terminating set NT1. These main and auxiliary power sources are normally interconnected to the phantom circuit on the two two-wire lines required by the S or T interface by means of two controllable switch circuits controlled in anti-phase by a circuit for detecting the presence of mains where it is used to constitute the main power source.

This conventional solution suffers from the drawback of requiring the main source to be located in the immediate vicinity of the NT1 set of the remote terminal NT unless a special signal link can be laid from the circuit for detecting the presence of mains located at the main power source to the controllable switch circuit which controls the switching on of the auxiliary power source situated at said NT1 set.

Figure 2:
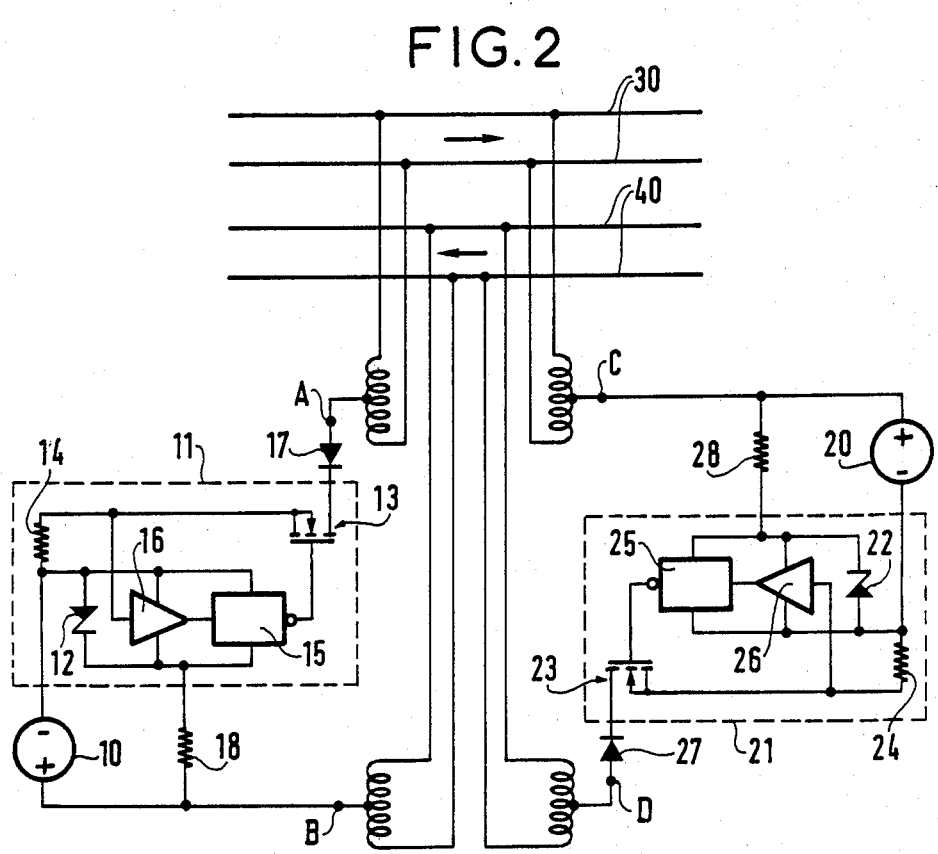
FIG. 2 is a circuit diagram of an emergency power supply in accordance with the invention connected to the phantom circuit of the two two-wire links which are required by the S or the T interface of an access to the integrated service digital telephone network.

The D.C. power supply circuit of FIG. 2 avoids this drawback. It comprises two floating potential D.C. power sources: a main source 10 and an auxiliary source 20. These sources may be geographically separate since the only point they have in common is their common load. Each of them is provided with a current limiting protection device 11, 21, having the same structure in both cases and connected, in both cases, in series with the negative terminal of the protected source. The protection devices are connected in contention, i.e. in parallel and in opposition via the phantom circuit of the two two-wire links 30 and 40 of the S or T interface.

Two non-return diodes 17 and 27 are also interposed in series with the current limiting and protection devices 11 and 21 in order to protect the sources 10 and 20 from possible reversal of the current flow direction through the load.

The current limiting and protection device 11, 21 connected in series with the negative terminal of its source 10, 20 is powered by the voltage delivered by the protected source via a zener diode 12, 22 connected in series with a resistor 18, 28 to the terminals of said source. It includes an adjustable impedance ballast resistance 13, 23 and a current-measuring resistance 14, 24 connected in series and in that order on the return path for the power supply current delivered by the protected source 10, 20. In the embodiment described, the ballast circuit 13, 23 is constituted by a N type MOS transistor controlled as a switch by a monostable circuit 15, 25 which is in turn tripped by a threshold comparator 16, 26 which is sensitive to the voltage across the terminals of the current measuring resistance 14, 24.

In the rest position, and when an output voltage is present from the protected source 10, 20, the monostable circuit 15, 25 delivers sufficient voltage to the grid of the ballast MOS transistor 13, 23 to saturate the transistor. Otherwise, either because the monostable is at rest but unpowered because of a failure in the protected source 10, 20, or else because the monostable has tripped due to the threshold of the comparator 16, 26 being exceeded by the voltage appearing across the terminals of the current measuring resistance 14, 24, the monostable switches off the ballast MOS transistor 13, 23 by bringing the potential of its grid electrode to the vicinity of the potential of its source electrode.

The current limiting and protection device 11, 22 thus has three possible modes of operation:

A normal mode in which it has no effect, with the protected source 10, 20 delivering a current below the limiting value which would cause the threshold of the comparator 16, 26 to be exceeded, and would thus trip the monostable 15, 25.

An excess load mode caused by a load drawing more current from the protected source 10, 20 than the limit value set by the threshold of the comparator 16, 26. When this mode starts the comparator 16, 26 trips the monostable circuit 15, 25 which switches off the ballast transistor 13, 23 for a period of time T1 during the protected source is isolated from the load. When the period of time T1 has elapsed, the monostable 15, 25 returns to the rest state and again saturates the ballast transistor 13, 23, thereby reconnecting the protected source to the load and possibly causing the monostable circuit 15, 25 to be tripped again if the cause which gave rise to excess current being drawn has not disappeared. The average current delivered by the protected source in this excess mode load is reduced by a factor determined by the ratio of the excitation period T1 of the monostable 15, 25 and its minimum rest period t1, which ratio is selected to be large enough to ensure that the average current is small compared with the capacity of the protected source 10, 20.

A no power mode where the protected source 10, 20 is no longer supplying a voltage, for example due to a mains failure, where the ballast transistor 13, 23 remains switched off, thereby putting the outlets of the protected source 10, 20 into a high impedance state so as to avoid short-circuiting the load.

The thresholds of the comparators 16 and 26 of the current limiting and protection devices 11, 21 are selected so as to give the main source 10 a current limit $I_M$ which is considerably greater than the current limit $I_m$ of the auxiliary source 20, e.g. ten times greater. Thus, when both the main source 10 and the auxiliary source 20 (both of which sources are floating) are indeed present and in contention via the phantom circuit of the two-wire links 30, 40, each of them gives rise to an increasing overload current situation for the other, which situation is interrupted by the current limiting and protection device 21 which trips first, thereby withdrawing the auxiliary source 20 and allowing the main source 10 to impose its polarity on the load.

In the event of a failure in the main source 10, for example in the event of a failure in the mains from which it draws power, its current limiting and protection device 11 is no longer powered, thereby switching off the transistor 13, while simultaneously the current limiting and protection device 21 of the auxiliary source 20 releases, thereby enabling the auxiliary source 20 to be substituted therefor across the terminals of the load while simultaneously reversing the polarity thereof.

When the main source 10 is re-established, both sources are again in contention and they again overload each other mutually until the overload current interrupted by the current limiting and protection circuit 21 withdrawing the auxiliary source 20.

In the event of both the main source 10 and the auxiliary source 20 being defective, neither of the current limiting and protection devices 11 and 21 is powered, thereby causing the outlets from both sources 10 and 20 to take a high impedance state.

FIG. 3 shows the voltage-current characteristic of the above-described power supply in the event of normal operation, i.e. when the main source 10 is operating, such that the voltage appearing across its terminals corresponds to the difference in potential which exists between two-wire link 40 and two-wire link 30, (i.e. between points A and B or D and C in FIG. 2).

This characteristic has four distinct operating zones:

A first operating zone when the voltage across the terminals of the load is greater than the unloaded voltage Vo of the main source. This is a forced positive excess voltage situation in which the load appears as a voltage source having the same sign and greater amplitude than the main source 10. The load attempts to impose a reverse current through the main source 10, and this is blocked by the non-return diode 17 while simultaneously tripping or keeping tripped the current limiting and protection device 21 of the auxiliary source 20.

A second operating zone immediately below the no load voltage Vo of the main source which corresponds to normal active power supply conditions, with the current delivered by the source running from zero to the limit value $I_M$ depending on the requirements of the load, with a current in excess of $I_M$ tripping the current limiting and protective device 11.

A third operating zone running down to zero potential and corresponding for the main source 10 to transient conditions caused by a load attempting to draw a current therefrom which is greater than the limiting value $I_M$, thereby causing its current limiting and protection device to trigger. This transient condition gives rise to a low current and it ceases as soon as the cause of the overload current disappears.

A fourth operating zone in which the voltage across the terminals of the load is of opposite polarity to that provided by the main source when in operation. This corresponds to forced negative overvoltage conditions in which the load is imposing excess current on the main source 10, thereby tripping its current limiting and protection device 11 while the reverse current it attempts to impose on the auxiliary source 20 is blocked by the non-return diode 27. In a manner of speaking, this is a kind of super short circuit since the voltage is no longer zero but is forced below zero to values which are opposite in sign to the main source. These conditions may occur if a D.C. power supply of opposite polarity to the main source 10 and having a greater current capacity than the main source 10 is connected thereto as a load. This gives rise to a stable situation for the power supply without heat dissipation since the current limiting and protection device 11 limits the current to an extremely low value.

In the absence of the main source 10, the auxiliary source 20 takes over and provides a power supply having a voltage-current characteristic which is similar in shape to that described above and which can be deduced from the above characteristic by inverting the signs of the voltages and by replacing the current limit value $I_M$ by the smaller value $I_m$ applicable to the auxiliary source 20, and, where appropriate, by replacing the no load voltage Vo of the main source 10 by the corresponding no load voltage Vo of the auxiliary source 20, supposing said no load voltages are different.

Without going beyond the scope of the invention, it is possible to modify various dispositions or to replace various means by equivalent means. In particular, it is possible in the current limiting and protection devices to obtain current limitation by continuously varying the ballast transistor rather than by switching it on and off, with the comparator acting on the ballast transistor so that the voltage appearing across the terminals of the current measuring resistance reaches a ceiling at a limit value corresponding to the selected current limit value.

I claim:

1. An emergency D.C. electrical power supply with emergency status being indicated by polarity reversal, wherein the power supply comprises a main D.C. electrical power source provided with a protection device causing its output to go to a high impedance state in the absence of a voltage across its terminals, and an auxiliary D.C. electricity power source connected in parallel and in opposition with the main source and provided with a current limiting device which is normally tripped by the additional current which the main source attempts to impose thereon.

2. A power supply according to claim 1, wherein the protection device of the main source is also provided with current limiting means.

3. A power supply according to claim 1, wherein the current limiting device of the auxiliary source is provided with means causing the outlet from said auxiliary source to pass to a high impedance state in the absence of a voltage at its terminals.

4. A power supply according to claim 1, wherein the main source and the auxiliary source are each provided with a respective non-return diode preventing current from flowing through them in the reverse direction.

5. A power supply according to claim 1, wherein the protection device of the main source is connected in series therewith and is powered by a voltage developed between the two terminals of the main source and passes to the high impedance state when unpowered.

6. A power supply according to claim 5, wherein the protection device of the main source is powered by the voltage delivered by said main source via a zener diode connected to the terminals of said main source via a series resistance.

7. A power supply according to claim 1, wherein the current limiting device of the auxiliary source includes a ballast circuit of variable impedance and a current measuring resistance connected in series in the current path of the auxiliary source, together with control means for controlling the ballast circuit as a function of the voltage appearing across the terminals of the current measuring resistance.

8. A power supply according to claim 7, wherein said ballast circuit is a transistor which is on/off switched, and wherein said control means for controlling the ballast circuit include a monostable circuit tripped by a threshold comparator which is sensitive to the voltage developed across the terminals of the current measuring resistance.

9. A power supply according to claim 1, wherein the current limiting device of the auxiliary source is powered by the voltage developed across the terminals of the auxiliary source and switches to the high impedance state when unpowered.

* * * * *